No. 862,540. PATENTED AUG. 6, 1907.
G. CHRISTENSON.
PACKING EXPANDER FOR AIR BRAKE CYLINDERS.
APPLICATION FILED DEC. 5, 1906.
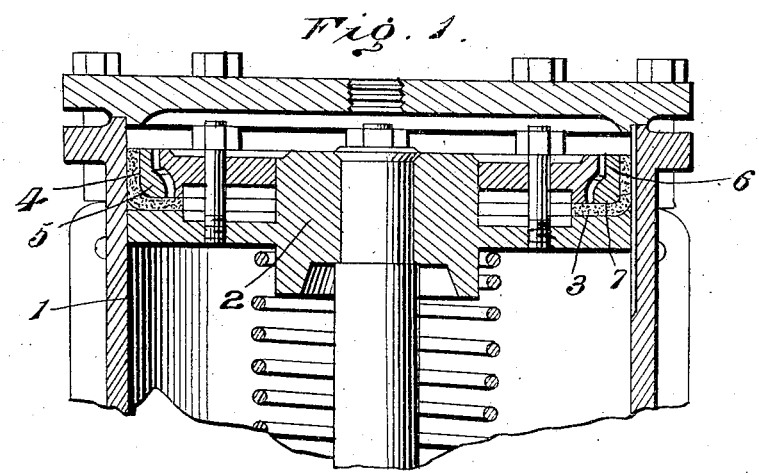
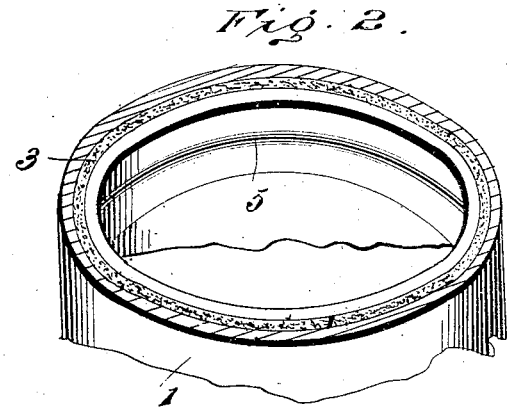
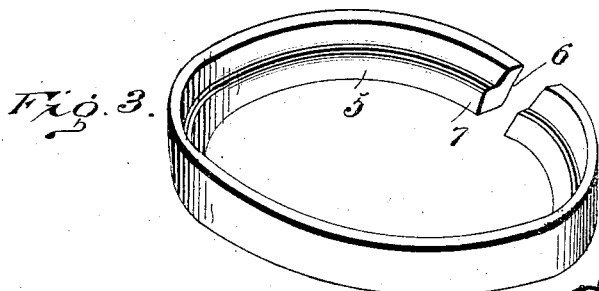
Witnesses
Inventor
Geo. Christenson,
By
Attorneys

UNITED STATES PATENT OFFICE.

GEORGE CHRISTENSON, OF NEVADA, MISSOURI.

PACKING-EXPANDER FOR AIR-BRAKE CYLINDERS.

No. 862,540.   Specification of Letters Patent.   Patented Aug. 6, 1907.

Application filed December 5, 1906. Serial No. 346,466.

*To all whom it may concern:*

Be it known that I, GEORGE CHRISTENSON, a citizen of the United States, residing at Nevada, in the county of Vernon and State of Missouri, have invented certain new and useful Improvements in Packing-Expanders for Air-Brake Cylinders, of which the following is a specification.

In air brake mechanism a tight joint is maintained between the piston cylinder by means of a leather packing which is expansible and adapted to be forced outward by the pressure of the air. Usually, the leather packing is of cup form, the outer edge portion lying against the walls of the brake cylinder being pressed outward by means of an expansible ring which is of less diameter or depth than the length of the portion of the leather packing lying against the walls of the cylinder, and as a consequence the portion of the packing projecting beyond the expansible ring is crimped or inclines away from the walls of the cylinder, thereby permitting air at times to come between the walls of the brake cylinder and the packing, resulting in detracting from the efficiency of the mechanism and oftentimes causing delay and vexation and preventing positive and quick action of the brakes, with the result that accidents occur.

The purpose of this invention is to force the upturned portion of the packing leather close against the walls of the brake cylinder at all times, thereby preventing possible formation of a space between said upturned portion of the packing and the walls of the cylinder for the entrance of air.

The invention consists, essentially, of an expanding ring of a height or depth corresponding to the depth or length of the upturned portion of the packing leather, said expanding ring in its specific form being approximately of angle shape in transverse section, one wing bearing against the packing leather in the plane of the piston and the other wing bearing against the upturned portion of the packing leather lying against the walls of the brake cylinder, all as will appear more fully hereinafter and as set forth in the accompanying drawings, in which:

Figure 1 is a sectional view of a brake cylinder and piston, the latter embodying the invention. Fig. 2 is a perspective view of a portion of the cylinder and piston, showing more clearly the relative arrangement of the parts. Fig. 3 is a detail perspective view of the expansible ring.

Corresponding and like parts are referred to in the following description and indicated in all the views of the drawings by the same reference characters.

The brake cylinder 1, piston head 2 and adjunctive parts may be of any approved construction or type. The packing leather 3 is secured to the piston head in the accustomed way and is provided with the upturned portion 4 which is adapted to lie against the inner walls of the brake cylinder. The expander ring 5 is arranged upon the inner side of the upturned portion 4 of the packing leather and is of angle formation in transverse section and comprises wings 6 and 7, the latter being in the plane of the packing leather 3 and bearing thereagainst and the wing 6 bearing against the upturned portion 4 of the packing leather and of a height equal to the depth thereof, so as to brace said upturned portion 4 outward against the inner walls of the brake cylinder and prevent the formation of any space which would admit of air, steam or like medium finding its way between the upturned portion 4 and the walls of the brake cylinder. The expander ring 5 is split, thereby admitting of diametrical contraction or expansion of said ring and in order that a close joint may be maintained between the end bordering upon the space, the extremities are inclined or cut on oblique lines. When placing the ring 5 in position it is contracted, hence the normal tendency to expand forces the upward portion 4 of the packing leather outward against the walls of the brake cylinder and since the wing 6 is about equal in depth to the upturned portion 4, the latter is subjected to outward pressure throughout its extent.

From the foregoing it will be observed that an expander constructed substantially as set forth prevents the formation of any space between the outer portion of the packing leather and the walls of the brake cylinder, hence annoyance, delays and casualties attributable to ill fitting pistons are wholly obviated by the present invention and the brake mechanism is rendered thoroughly effective and reliable.

Having thus described the invention, what is claimed as new is:

An expanding ring for the packing leather of air brake mechanism, the same having an oblique split, and of angle formation in transverse section, one wing adapted to bear against the packing leather and the other wing to exert an outward pressure against every portion of the upturned part of the packing leather so as to preclude the formation of any space between said upturned portion of the packing leather and the inner walls of the cylinder.

In testimony whereof I affix my signature in presence of two witnesses.

GEORGE CHRISTENSON.

Witnesses:
ALMON H. MAUS,
JAY RINEHART.